March 28, 1950      W. QUEIROLO      2,502,341
FEEDING CONVEYER
Filed April 11, 1949      2 Sheets-Sheet 1
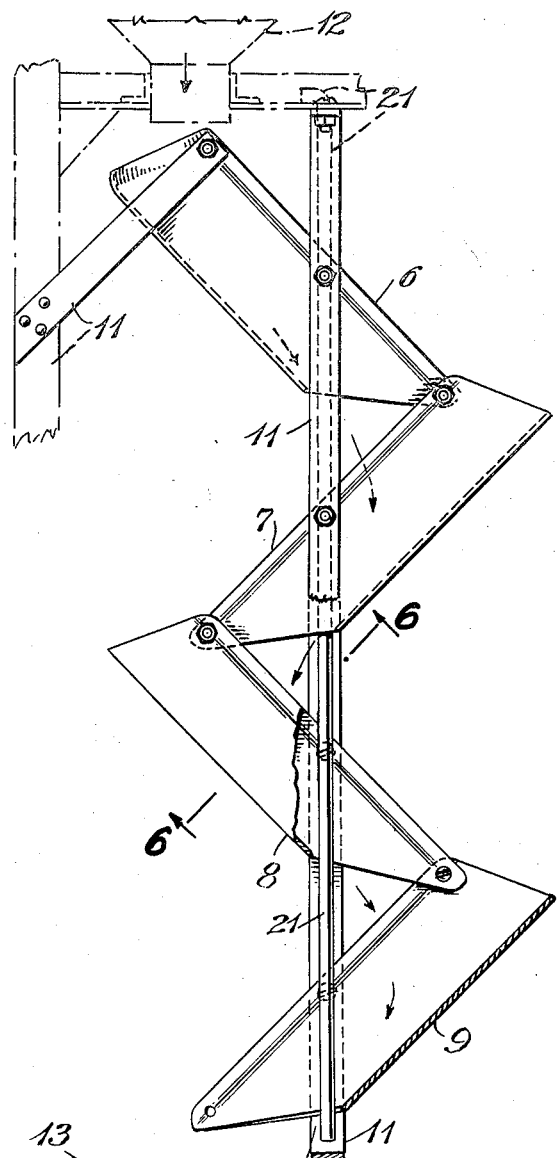
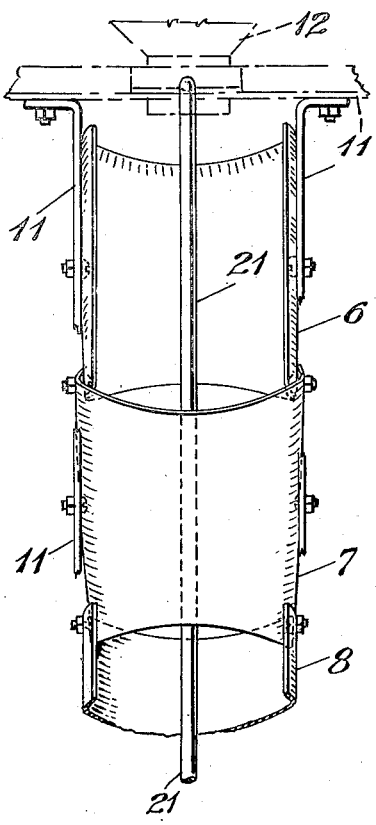
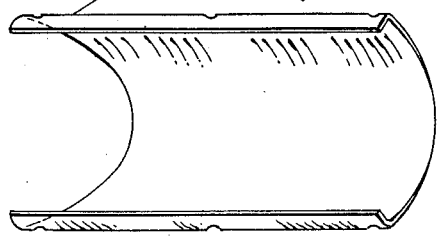
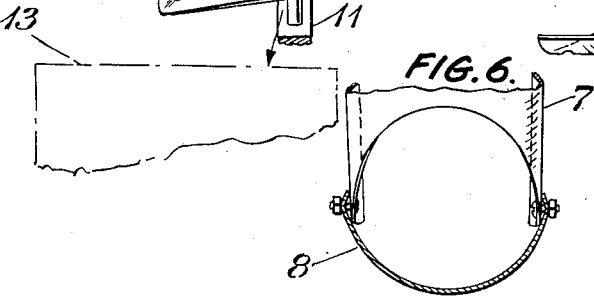
INVENTOR
WILLIAM QUEIROLO
BY
ATTORNEY March 28, 1950 W. QUEIROLO 2,502,341
FEEDING CONVEYER
Filed April 11, 1949 2 Sheets-Sheet 2
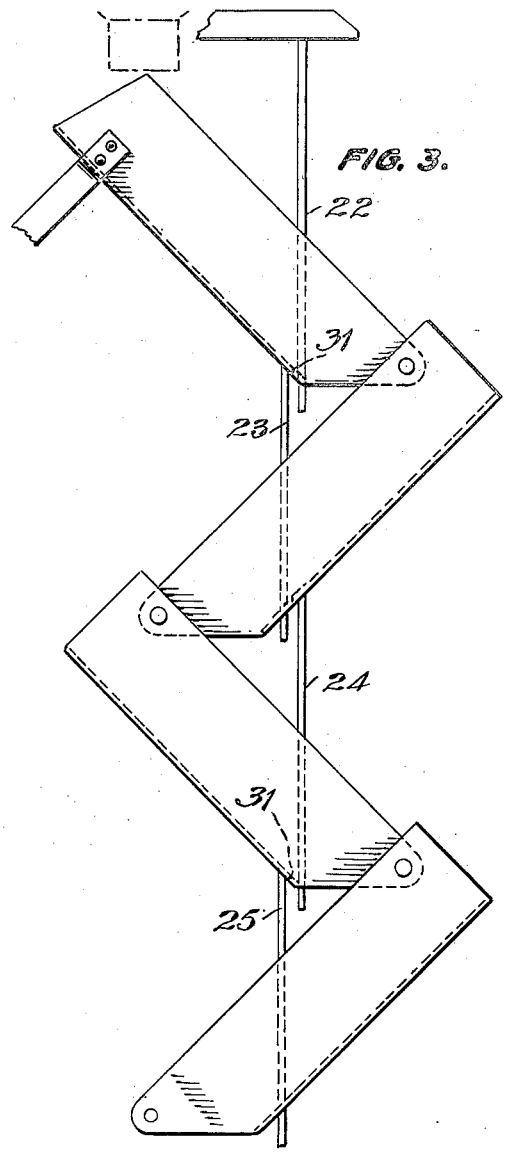
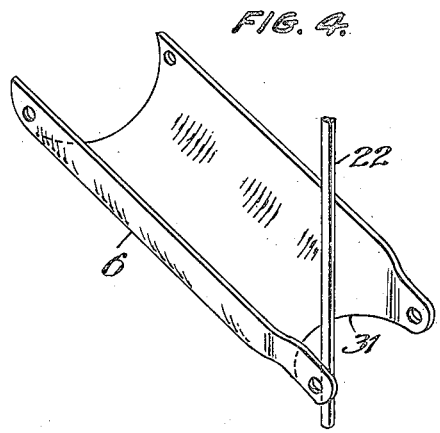
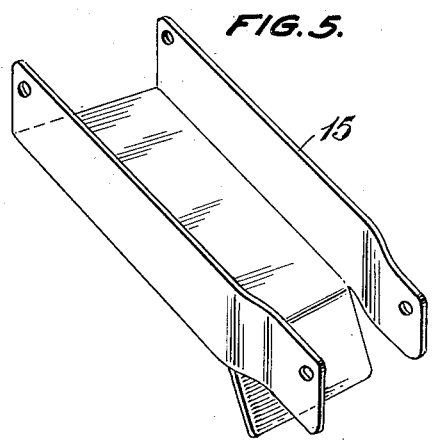
INVENTOR
WILLIAM QUEIROLO
BY
ATTORNEY Patented Mar. 28, 1950

2,502,341

UNITED STATES PATENT OFFICE 2,502,341

FEEDING CONVEYER

William Queirolo, San Francisco, Calif.

Application April 11, 1949, Serial No. 86,826

4 Claims. (Cl. 193—27)

This invention relates to an improved device for the feeding of a mixture of finely divided solid materials when it is desired to preserve homogeneity of such a mixture; coffee is commonly made up of a mixture of coffee beans secured from plants grown in different parts of the world, the beans varying in size and density. When such a mixture is permitted to flow by gravity, the beans tend to segregate so that the mixture becomes heterogeneous rather than homogeneous. The feeding device of the present invention enables such a mixture to be moved by gravity flow in a continuous stream. While the invention as particularly described has been applied to the feeding of coffee, it is by no means limited to this and it can, in fact, be applied successfully to the feeding of other materials.

In general, it is the broad object of the present invention to provide a novel feeding device for coffee beans and the like.

A further object of the present invention is to provide a feeding structure enabling a mixture to be fed by gravity so that the material can be moved from one elevation to the other without damage to the material.

The invention includes other objects and features of advantage, some of which, together with the foregoing, will appear hereinafter wherein the present preferred form of feeding device of this invention is disclosed.

Referring to the drawing, Figure 1 is a side elevation partly in section, showing one embodiment of a feeding device of the present invention.

Figure 2 is a front elevation of a portion of the device shown in Figure 1.

Figure 3 is a side view through another modified form of the device of the present invention.

Figure 4 is a perspective view of a portion of one of the feeding elements shown in Figure 3.

Figure 5 is a perspective view of another form of feeding element embodying the present invention.

Figure 6 is a section along the line 6—6 in Figure 1.

Figure 7 is a perspective view of one section of the chute.

Referring to the drawings, I have shown in Figures 1 and 2 a plurality of chute members designated as 6, 7, 8 and 9, in the order of their vertical position. The several chutes are arranged and supported by framework 11 in a staggered relation so that material delivered as from a hopper 12 passes on to chute 6 which, in turn, discharges onto chute 7, and so on down the series, enabling material to be delivered from chute 10 as into a receptacle 13. Because the material is discharged from one chute and strikes forcefully against an adjacent and cooperatively positioned chute, the material comes substantially to rest so that the speed of its descent is successively broken and it arrives at its point of rest, in this instance, container 13, with only that velocity occasioned by its discharge onto, down and off the last chute, in this instance, chute 10.

Thus the several chutes are shown as being positioned at substantially at 90° to one another. The angle can be varied to suit the material handled; with free flowing materials this angle suffices but one can vary the angular relation between the chutes to suit the material, its angle of repose and its flowability.

The several chutes are preferably arcuate in cross section, but one can utilize other forms such as a rectangular chute 15 of the form shown in Figure 5, this form being particularly suited to the handling of solid objects such as packages of beans, raisins and the like.

I have observed that when a mixture of material such as coffee beans is permitted to flow down through the several chutes 6–10, as shown in Figures 1, 2 and 3, the beans come to rest substantially upon each successive chute so that a segregation occurs at each successive chute. Because of this, the composition of the stream delivered from the last chute 10 is different from that delivered initially to chute 6. This I have been able to overcome by providing a rod member 21 adjacent to the discharge end of each chute. The rod member has the effect of dividing the stream issuing from a chute into two separate streams which strike the opposite chute and destroy the tendency to pile up and retain a stationary mass upon the lower, next adjacent chute. The rod can be continuous, passing through the entire series of chutes as in Figures 1 and 2, rod resting against the discharge lip 31 of each chute. I prefer, however, that it be provided, in effect, by a series of rods 22, 23, 24 and 25 (Figures 3 and 4), supported from the hopper and from the next adjacent chute, so that the rod depends and extends outwardly in a spaced relation to the discharged lip 31 of the next lower chute so that string and other fibrous material does not hang up and is retained between the rod and the end of the chute.

The device of the present invention is also useful as a mixing device for if separate streams of various materials are fed into one of the chutes in the series, by the time the stream issues from the last chute, it will be thoroughly mixed and of a homogeneous nature.

The device of the present invention can be used to advantage in feeding material into a bin or storage hopper for the material will come to rest upon other material in the bin and will not spill out or run for any considerable distance from the chute at the discharge level. When the bin is to be emptied, each chute will feed automatically as the level falls past it. In this way, the storage of materials in a homogeneous mixture is insured.

The rod member can be of any suitable section, e. g. circular, square, rectangular, or triangular.

From the foregoing, I believe it will be apparent that I have provided a novel and simple, improved form of feeding device.

I claim:

1. A feeding conveyor for moving a finely divided material from an upper to a lower elevation comprising a series of chute members arranged in a staggered relation and at successively different elevations, between said upper and said lower elevations to move material gravitally to a lower chute in the series from the immediately adjacent chute at the next highest elevation, and a rod member positioned cooperatively adjacent to the discharge lip on each chute member and extending above and below said lip a distance sufficient to maintain said rod member in engagement with material passing over said discharge lip to divide the stream issuing from such member into two streams.

2. A feeding conveyor for moving a finely divided material from an upper to a lower elevation comprising a series of chute members arranged in a staggered relation and at successively different elevations between said upper and said lower elevations to move material gravitally to a lower chute in the series from the immediately adjacent chute at the next highest elevation, and a rod member positioned cooperatively adjacent to but spaced outwardly from the discharge lip on each chute member to divide the stream issuing from such member into two streams, said rod member extending continuously from a position above the discharge lip of the uppermost chute to a position substantially below the discharge lip of the lowermost chute in the series.

3. A feeding conveyor for moving a finely divided material from an upper to a lower elevation comprising a series of chute members arranged in a staggered relation and successively different elevations between said upper and said lower elevations to move material gravitally to a lower chute in the series from the immediately adjacent chute at the next highest elevation, a rod member secured to the underside of each chute member and extending vertically downwardly past and spaced outwardly from the discharge lip of the next immediately adjacent chute at the next lower elevation and extending below said lip a distance sufficient to maintain said rod member in engagement with material passing over said discharge lip of said adjacent chute member to divide the stream issuing from such member into two streams.

4. A feeding conveyor as in claim 1 wherein a single rod member is provided and extends cooperatively adjacent to the discharge lip on each of said chute members.

WILIAM QUEIROLO.

REFERENCES CITED

The following references are of record in the file of this patent:

UNITED STATES PATENTS

| Number | Name | Date |
| --- | --- | --- |
| 461,632 | Humphrey | Oct. 20, 1891 |
| 1,583,833 | Howell | May 11, 1926 |
| 1,839,494 | Pardee | Jan. 5, 1932 |
| 1,918,398 | Johnson | July 18, 1933 |